United States Patent
Hsu et al.

(10) Patent No.: US 10,108,842 B2
(45) Date of Patent: Oct. 23, 2018

(54) METHOD FOR ASSEMBLING FINGERPRINT IDENTIFICATION MODULE

(71) Applicant: Primax Electronics Ltd., Taipei (TW)

(72) Inventors: Mao-Hsiu Hsu, Taipei (TW); Chih-Hao Hsu, Taipei (TW); Ying-Chieh Chuang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 59 days.

(21) Appl. No.: 15/367,602

(22) Filed: Dec. 2, 2016

(65) Prior Publication Data
US 2018/0101717 A1    Apr. 12, 2018

(30) Foreign Application Priority Data
Oct. 7, 2016    (TW) .............................. 105132592 A

(51) Int. Cl.
*G06K 9/20*    (2006.01)
*G06K 9/00*    (2006.01)

(52) U.S. Cl.
CPC ..... *G06K 9/00087* (2013.01); *G06K 9/00013* (2013.01)

(58) Field of Classification Search
CPC ................... G06K 9/00013–2009/0006; G06K 9/00006–9/0012; H01L 21/782–21/786; H01L 2221/68327–2221/68336
See application file for complete search history.

(56) References Cited

U.S. PATENT DOCUMENTS

| 9,847,254 B2 * | 12/2017 | Lin ................ H01L 21/76898 |
| 2009/0230487 A1 * | 9/2009 | Saitoh ................ B81B 7/0061 257/419 |
| 2010/0048000 A1 * | 2/2010 | Kobayashi .......... H01L 21/6835 438/463 |
| 2014/0167226 A1 * | 6/2014 | Miccoli ............... G03F 7/70625 257/620 |
| 2016/0315009 A1 * | 10/2016 | Lei .......................... H01L 21/78 |

FOREIGN PATENT DOCUMENTS

CN        205183009 U  *  4/2016

\* cited by examiner

*Primary Examiner* — Brian Werner
(74) *Attorney, Agent, or Firm* — Muncy, Geissler, Olds & Lowe, P.C.

(57) ABSTRACT

A method for assembling a fingerprint identification module is provided. During the process of cutting a sensing strip, the junction parts between adjacent fingerprint sensors are retained. Consequently, the cut sensing strip is still a one-piece structure. Then, a paint-spraying process is performed to spray paint on the one-piece structure of the sensing strip. After the junction parts are removed, plural individual fingerprint sensors are produced. In comparison with the conventional technology of spraying paint on the individual fingerprint sensors, the assembling time of the method of the present invention is largely reduced. Consequently, the production efficiency of the present invention is enhanced.

11 Claims, 5 Drawing Sheets

METHOD FOR ASSEMBLING FINGERPRINT IDENTIFICATION MODULE

FIELD OF THE INVENTION

The present invention relates to an assembling method, and more particularly to a method for assembling a fingerprint identification module.

BACKGROUND OF THE INVENTION

Recently, a fingerprint identification technology has been applied to a variety of electronic products. By using the fingerprint identification technology, the user's fingerprint can be inputted into an electronic product and saved in the electronic product. For unlocking the electronic product, the user has to input the fingerprint through a fingerprint identification module. The way of unlocking the electronic product by the fingerprint identification technology is faster and more user-friendly than the way of manually inputting the password. Consequently, the fingerprint identification technology is favored by many users, and the demands on the fingerprint identification module are gradually increased.

Generally, a fingerprint identification module comprises a fingerprint sensor, a protective cover and a circuit board. The fingerprint sensor is disposed on and electrically connected with the circuit board. The fingerprint sensor is used for sensing the user's finger and retrieving the information of the user's finger. The protective cover is used for covering the fingerprint sensor in order to protect the fingerprint sensor. The user's finger is only permitted to touch the protective cover. Since the user's finger is not directly contacted with the fingerprint sensor, the fingerprint sensor is not easily damaged.

A method of assembling a conventional fingerprint identification module will be described as follows. Firstly, the fingerprint sensor is placed on the circuit board, and the fingerprint sensor is electrically connected with the circuit board. Then, the protective cover is stacked on the fingerprint sensor, and the protective cover and the fingerprint sensor are adhered on each other. Meanwhile, the conventional fingerprint identification module is assembled.

In the above assembling method, the fingerprint sensor is obtained by cutting a sensing strip. A process of producing the fingerprint sensor will be described as follows. Firstly, the sensing strip is fixed on a base plate through an adhesive. Then, the sensing strip is cut to produce plural fingerprint sensors according to a predetermined size. The actual sizes of the plural fingerprint sensors are equal to or close to the predetermined size. In fact, the fingerprint sensor obtained by the cutting procedure has a cutting tolerance.

FIG. 1 is a schematic view illustrating the structure of a conventional fingerprint sensor. As shown in FIG. 1, the size of a top surface 101 of the fingerprint sensor 10 is close to or nearly equal to the predetermined size. However, due to the cutting skew, the size of a bottom surface 102 of the fingerprint sensor 10 is possibly larger than the predetermined size. Although the size of the top surface 101 of the fingerprint sensor 10 is close to the predetermined size, the fingerprint sensor 10 is unable to pass the size test because the size of the bottom surface 102 of the fingerprint sensor 10 is much larger than the predetermined size. Under this circumstance, the fingerprint sensor 10 is determined as unqualified product.

Generally, the fingerprint identification module is installed on an electronic device such as a smart phone or a tablet computer, and the fingerprint identification module is partially exposed outside a case of the electronic device. Consequently, the fingerprint identification module can be operated by the user. Moreover, the color of the fingerprint identification module and the color of the case of the electronic device are usually different. For achieving an aesthetically-pleasing purpose, it is preferred that the color of the fingerprint identification module and the color of the case of the electronic device are identical. Consequently, in the conventional method of assembling the fingerprint identification module, an additional paint-spraying process is required. For example, after the sensing strip is cut into the plural individual fingerprint sensors, the paint-spraying process is performed to spray paint on the plural individual fingerprint sensors. The paint-spraying process increases the time period of the overall fabricating process and reduces the fabricating efficiency.

Therefore, there is a need of providing a method for assembling a fingerprint identification module with high fabricating efficiency.

SUMMARY OF THE INVENTION

The present invention provides a method for assembling a fingerprint identification module with high fabricating efficiency.

In accordance with an aspect of the present invention, there is provided a method for assembling a fingerprint identification module. In a step (A), a sensing strip is provided. The sensing strip includes plural unseparated fingerprint sensors. The plural unseparated fingerprint sensors are connected with each other through junction parts. The junction part has a first thickness. In a step (B), a top surface of the sensing strip is cut according to a predetermined size, so that plural unseparated fingerprint sensors are defined and the junction part has a second thickness. The second thickness is smaller than the first thickness. In a step (C), a paint-spraying process is performed to spray paint on the cut sensing strip. In a step (D), the cut sensing strip is tuned upside down and fixed on a fixing base, and the junction parts are removed. Consequently, plural individual fingerprint sensors are produced. In a step (E), one of the plural individual fingerprint sensor and a circuit board together are combined together. Consequently, the fingerprint identification module is assembled.

In accordance with another aspect of the present invention, there is provided a method for assembling a fingerprint identification module. In a step (A), a sensing strip is provided. The sensing strip includes plural unseparated fingerprint sensors. The plural unseparated fingerprint sensors are connected with each other through junction parts. The junction part has a first thickness. In a step (B), a paint-spraying process is performed to spray paint on the sensing strip. In a step (C), a top surface of the sensing strip is cut according to a predetermined size, so that plural unseparated fingerprint sensors are defined and the junction part has a second thickness. The second thickness is smaller than the first thickness. In a step (D), the cut sensing strip is turned upside down and fixed on a fixing base, and the junction parts are removed. Consequently, plural individual fingerprint sensors are produced. In a step (E), one of the plural individual fingerprint sensor and a circuit board are combined together. Consequently, the fingerprint identification module is assembled.

From the above descriptions, the present invention provides a method for assembling a fingerprint identification module. During the process of cutting the sensing strip, the junction parts between the unseparated fingerprint sensors are retained. Consequently, the cut sensing strip is still a one-piece structure. Under this circumstance, it is easy to perform a paint-spraying operation on the large area of the one-piece structure of the sensing strip for a single time. Since the assembling time is reduced, the production efficiency is enhanced. Moreover, since it is not necessary to use the adhesive and the procedure of removing the residual fragments of the adhesive is omitted, the production efficiency is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a method for assembling a fingerprint identification module.

Figure 1:
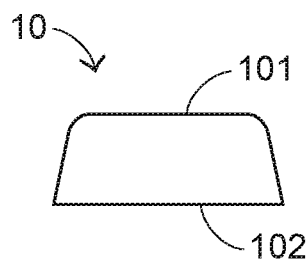
FIG. 1 is a schematic view illustrating the structure of a conventional fingerprint sensor.
Figure 2:
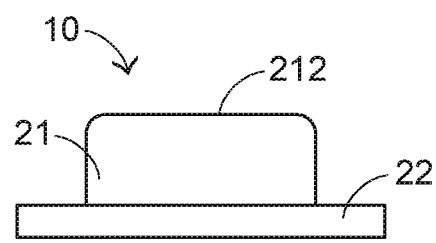
FIG. 2 is a schematic view illustrating a fingerprint identification module according to a first embodiment of the present invention.

FIG. 2 is a schematic view illustrating a fingerprint identification module according to a first embodiment of the present invention. As shown in FIG. 2, the fingerprint identification module 2 comprises a fingerprint sensor 21 and a circuit board 22. The fingerprint sensor 21 is fixed on the circuit board 22. In an embodiment, the fingerprint sensor 21 has a land grid array (LGA) package structure, and the circuit board 22 is a flexible printed circuit (FPC) or a rigid-flex board.

Figure 3:
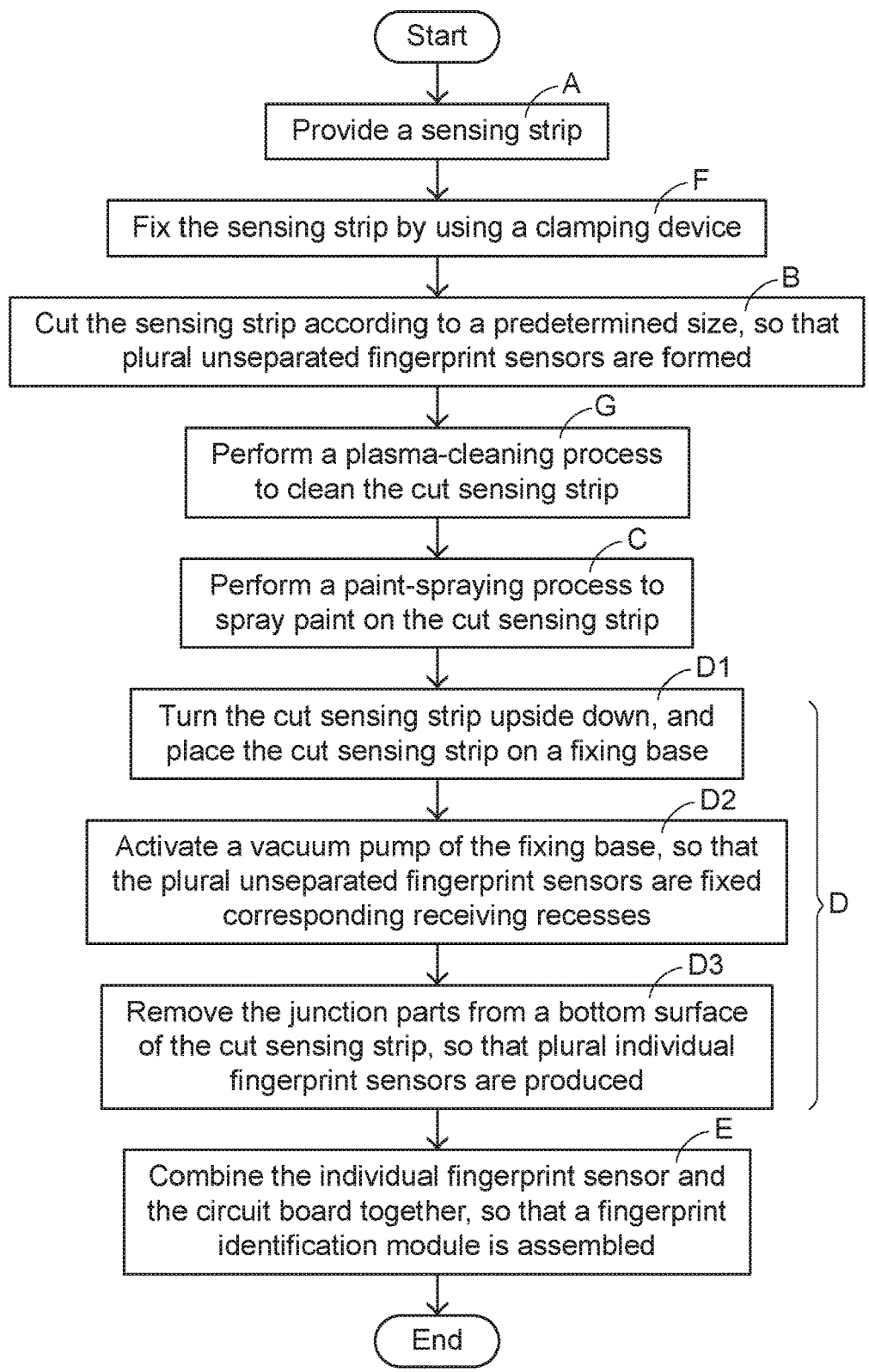
FIG. 3 schematically illustrates a flowchart of a method for assembling a fingerprint identification module according to a first embodiment of the present invention.

FIG. 3 schematically illustrates a flowchart of a method for assembling a fingerprint identification module according to a first embodiment of the present invention. The method comprises the following steps.

In a step A, a sensing strip is provided.

In a step F, the sensing strip is fixed by a clamping device.

In a step B, the sensing strip is cut according to a predetermined size, and thus plural unseparated fingerprint sensors are formed.

In a step G, a plasma-cleaning process is performed to clean the cut sensing strip.

In a step C, a paint-spraying process is performed to spray paint on the cut sensing strip.

In a step D, the cut sensing strip is turned upside down and fixed on a fixing base, and the junction parts between the unseparated fingerprint sensors are removed, so that plural individual fingerprint sensors are formed.

In a step E, the individual fingerprint sensor and the circuit board are combined together, so that a fingerprint identification module is assembled.

The step D comprises steps D1, D2 and D3. In the step D1, the cut sensing strip is turned upside down and placed on a fixing base, and the plural unseparated fingerprint sensors are partially accommodated within corresponding receiving recesses of the fixing base. In the step D2, a vacuum pump of the fixing base is activated to generate a suction force, and the plural unseparated fingerprint sensors are fixed in the corresponding receiving recesses in response to the suction force. In the step D3, the junction parts are removed from a bottom surface of the cut sensing strip, and thus the plural individual fingerprint sensors are produced.

Figure 4:
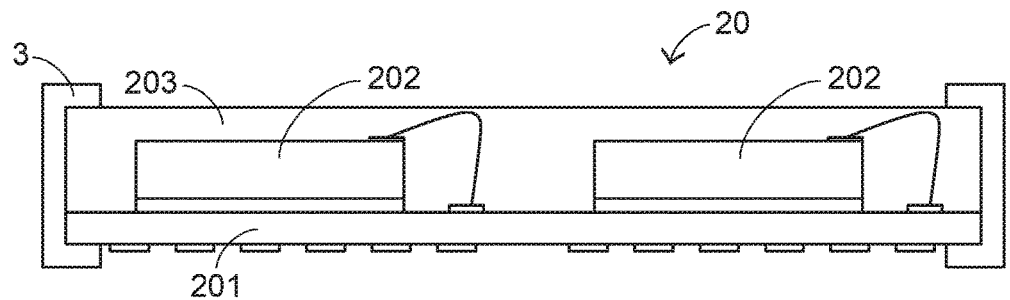
FIG. 4 is a schematic cross-sectional view illustrating a sensing strip of the fingerprint identification module according to the first embodiment of the present invention.
Figure 5:
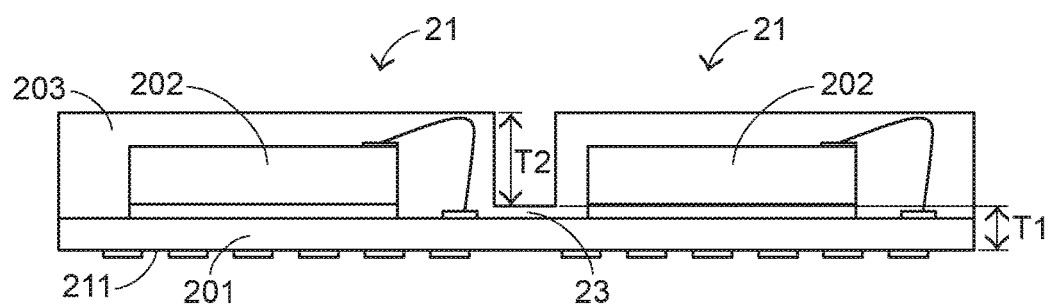
FIG. 5 is a schematic view illustrating the sensing strip of the fingerprint identification module according to the first embodiment of the present invention, in which the sensing strip is cut.
Figure 6:
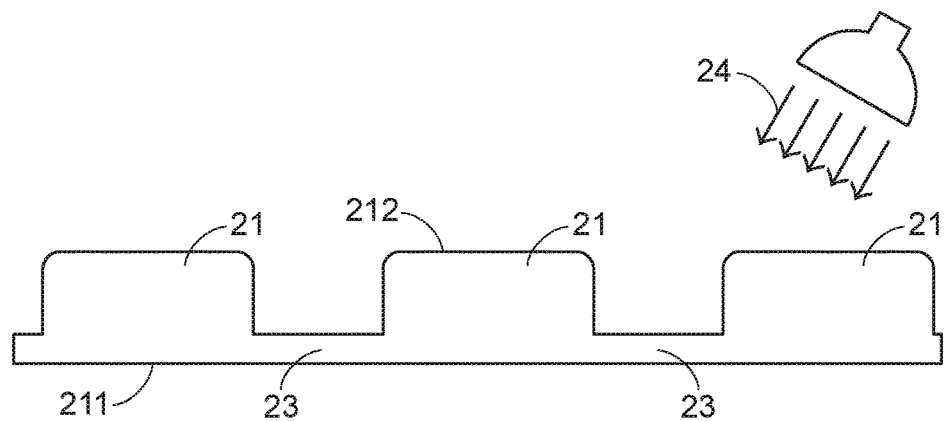
FIG. 6 schematically illustrates a paint-spraying process for spraying paint on the cut sensing strip of the fingerprint identification module according to the first embodiment of the present invention.
Figure 7:
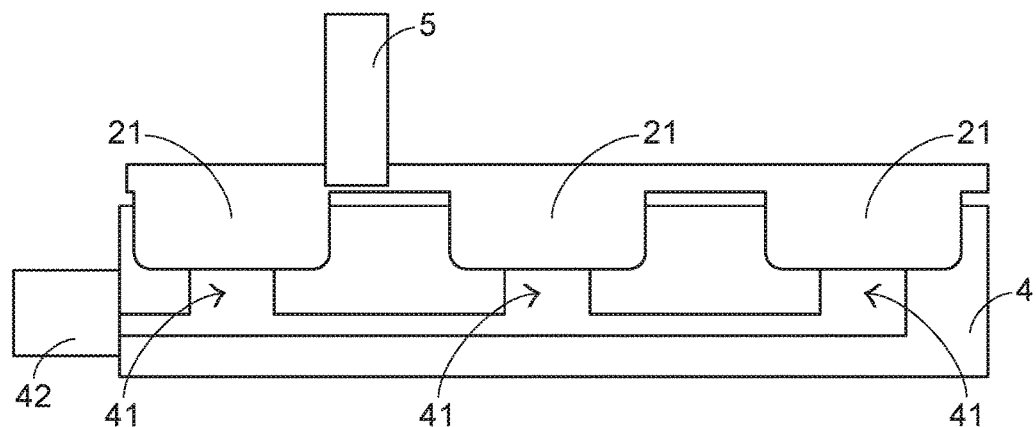
FIG. 7 is a schematic cross-sectional view illustrating the cut sensing strip of the fingerprint identification module that is fixed on a fixing base.
Figure 8:
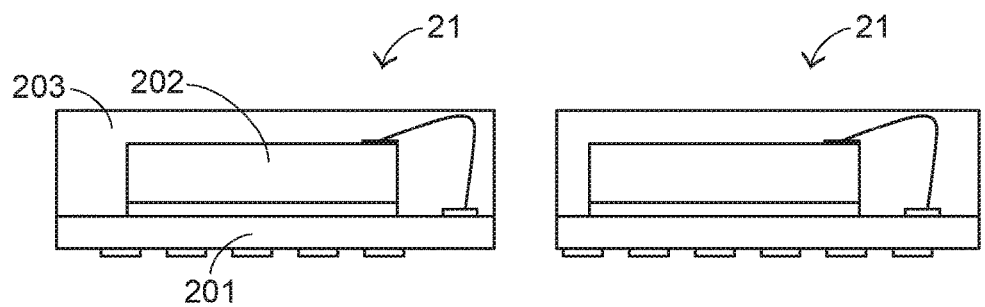
FIG. 8 is a schematic view illustrating two fingerprint sensors of the fingerprint identification module according to the first embodiment of the present invention.

Hereinafter, the operations of the method for assembling the fingerprint identification module will be illustrated with reference to FIGS. 2~8. FIG. 4 is a schematic cross-sectional view illustrating a sensing strip of the fingerprint identification module according to the first embodiment of the present invention. FIG. 5 is a schematic view illustrating the sensing strip of the fingerprint identification module according to the first embodiment of the present invention, in which the sensing strip is cut. FIG. 6 schematically illustrates a paint-spraying process for spraying paint on the cut sensing strip of the fingerprint identification module according to the first embodiment of the present invention. FIG. 7 is a schematic cross-sectional view illustrating the cut sensing strip of the fingerprint identification module that is fixed on a fixing base. FIG. 8 is a schematic view illustrating two fingerprint sensors of the fingerprint identification module according to the first embodiment of the present invention.

After the method for assembling the fingerprint identification module in the production line is started, the step A is performed. That is, a sensing strip 20 is provided. In FIG. 4, the structure of a sensing strip 20 is shown. The sensing strip 20 comprises a substrate 201, plural sensing dies 202 and an encapsulation layer 203. The plural sensing dies 202 are disposed on the substrate 201 and connected with the substrate 201 by a wire bonding process. The plural sensing dies 202 and a top surface of the substrate 201 are encapsulated by the encapsulation layer 203. In an embodiment, the encapsulation layer 203 is made of an epoxy molding compound (EMC).

Then, the step F is performed. As shown in FIG. 4, the sensing strip 20 is fixed by a clamping device 3. The clamping device 3 is operated by a manual force or a mechanical mechanism. Preferably, the clamping device 3 is operated by a mechanical mechanism. Consequently, the clamping device 3 can be operated in a fine and stable manner.

After the sensing strip 20 is fixed, the step B is performed. In the step B, the top side of the sensing strip 20 is cut according to a predetermined size, and thus plural unseparated fingerprint sensors 21 are formed. As shown in FIG. 5, every two adjacent unseparated fingerprint sensors 21 are connected with each other through a junction part 23. The junction parts 23 are located near the bottom surfaces 211 of the plural unseparated fingerprint sensors 21. As shown in FIG. 5, the junction part 23 is defined by a part of the encapsulation layer 203 and a part of the substrate 201.

In the step B, a cutting knife 5 as shown in FIG. 6 is used to cut the sensing strip 20 into the plural unseparated fingerprint sensors 21. The size of each unseparated fingerprint sensor 21 is close to the predetermined size. Particularly, the size of a top surface 212 of the unseparated fingerprint sensor 21 is close to the predetermined size. In this embodiment, a first length of the top surface 212 of the unseparated fingerprint sensor 21 is close to a first predetermined length of the predetermined size, and a first width of the top surface 212 of the unseparated fingerprint sensor 21 is close to a first predetermined width of the predetermined size. Preferably, after the sensing strip 20 is cut into the plural unseparated fingerprint sensors 21, the size of each unseparated fingerprint sensor 21 is identical to the predetermined size. In an embodiment, the thickness T1 of the junction part 23 is about 0.15 mm, and the thickness T2 of the unseparated fingerprint sensor 21 (i.e., the distance between the top surface 212 of the unseparated fingerprint sensor 21 and the top surface of the junction part 23, or the cut thickness of the sensing strip 20) is about 0.635 mm.

Then, the step G is performed. A plasma-cleaning process is performed to clean the cut sensing strip 20 (or the plural unseparated fingerprint sensors 21). Consequently, the dust on the cut sensing strip 20 and the scraps on the encapsulation layer 203 are removed. After the plasma-cleaning process is completed, the capability of the cut sensing strip 20 to adsorb paint in the subsequent step is enhanced.

Then, the step C is performed. A paint-spraying process is performed to spray paint 24 on the cut sensing strip 20. As shown in FIG. 6, the paint 24 is sprayed from a top side of the cut sensing strip 20 and sprayed on a top surface and a lateral surface of the cut sensing strip 20.

After the paint-spraying process is completed and the paint 24 on the cut sensing strip 20 is dried, the step D1 is performed. That is, the cut sensing strip 20 is turned upside down and placed on a fixing base 4. In addition, the plural unseparated fingerprint sensors 21 are partially accommodated within corresponding receiving recesses 41 of the fixing base 4. Then, the step D2 is performed. That is, a vacuum pump 42 of the fixing base 4 is activated to generate a suction force. In response to the suction force, the plural unseparated fingerprint sensors 21 are sucked into the corresponding receiving recesses 41. Meanwhile, as shown in FIG. 7, the bottom surfaces 211 of the plural unseparated fingerprint sensors 21 are exposed outside the fixing base 4. After the plural unseparated fingerprint sensors 21 are fixed on the fixing base 4, the step D3 is performed. That is, the junction parts 23 are removed from the bottom surfaces 211 of the unseparated fingerprint sensors 21, and thus plural individual fingerprint sensors 21 as shown in FIG. 8 are produced.

In this embodiment, the vacuum pump 42 is used for fixing the plural unseparated fingerprint sensors 21 in the corresponding receiving recesses 41. It is noted that the way of fixing the cut sensing strip 20 is not restricted. That is, various fixing means or fixing structures can be used to fix the cut sensing strip 20.

After the step D is completed, a size-measuring step is performed to measure the size of each individual fingerprint sensor 21. That is, the size of the top surface 212 of each individual fingerprint sensor 21 and the size of the bottom surface 211 of each individual fingerprint sensor 21 are measured and compared with the predetermined size. That is, the size-measuring step further judges whether the difference between the size of the top surface 212 (and the bottom surface 211) of each individual fingerprint sensor 21 and the predetermined size is within an acceptable value. The operations of the size-measuring step are well known to those skilled in the art, and are not redundantly described herein.

Then, the step E is performed. That is, the individual fingerprint sensor 21 and the circuit board 22 are combined together. Consequently, the fingerprint identification module 2 is produced. In an embodiment as shown in FIG. 2, the fingerprint sensor 21 is fixed on the circuit board 22 by a surface mount technology (SMT).

The following two aspects should be specially described. Firstly, the fingerprint sensor 21 is fixed on the circuit board 22 by a surface mount technology (SMT). Since it is not necessary to use the adhesive, no residual fragments of the adhesive are readily remained on the fingerprint sensor. Since the procedure of removing the residual fragments of the adhesive is omitted, the production efficiency of the present invention is enhanced.

Secondly, the sensing strip 20 is initially cut into plural unseparated fingerprint sensors 21. Consequently, the cut sensing strip 20 is still a one-piece structure. Under this circumstance, it is easy to perform the paint-spraying process on the one-piece structure of the cut sensing strip 20. After the paint-spraying process is completed, the one-piece structure of the cut sensing strip 20 is cut into the plural individual fingerprint sensors 21. The results of experiments demonstrate that the assembling time of the method of the present invention is shorter than the assembling time of the conventional technology. Consequently, the production efficiency is further enhanced.

Figure 9:
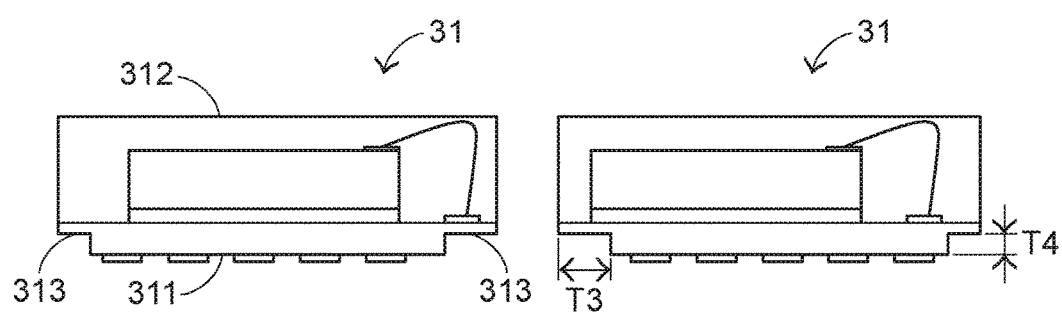
FIG. 9 is a schematic view illustrating two fingerprint sensors of the fingerprint identification module according to a second embodiment of the present invention.

In another embodiment, a cutting-enhancement operation is performed in the step D3 in order to increase the production yield of the fingerprint sensor. FIG. 9 is a schematic view illustrating two fingerprint sensors of the fingerprint identification module according to a second embodiment of the present invention. After the junction parts (not shown) are removed, the step D3 further comprises a step of forming plural concave structures 313 in the bottom surfaces 311 of the individual fingerprint sensors 31. Meanwhile, the size of the bottom surface 311 of the individual fingerprint sensor 31 is smaller than the size of the top surface 312 of the individual fingerprint sensor 31. That is, a second length of the bottom surface 311 of the individual fingerprint sensor 31 is smaller than the first predetermined length of the predetermined size. As shown in FIG. 9, the length T3 of the concave structure 313 is about 0~0.1 mm, and the height T4 of the concave structure 313 is about 0.12~0.18 mm. Preferably, the length T3 of the concave structure 313 is 0 mm. Consequently, the length of the top surface 312 of the individual fingerprint sensor 31, the length of the bottom surface 311 of the individual fingerprint sensor 31 and the predetermined size are identical.

As known, the conventional procedure of cutting the sensing strip usually results in the cutting skew of the fingerprint sensor. Due to the cutting skew, the size of the bottom surface of the fingerprint sensor is possibly larger than the size of the top surface of the fingerprint sensor, and the top surface of the fingerprint sensor is close to the predetermined size. Since the size of the bottom surface of the fingerprint sensor is larger than the predetermined size, the fingerprint sensor is unable to pass the size test. In accordance with the method of the present invention, the concave structure 313 is formed on the bottom surface 311 of the fingerprint sensor 31. Consequently, the size of the bottom surface 311 of the fingerprint sensor 31 is smaller than the size of the top surface 312 of the fingerprint sensor 31, and the top surface 312 of the fingerprint sensor 31 is close to the predetermined size. Consequently, even if the cutting skew is generated during the cutting process, the fingerprint sensor 31 can pass the size test.

Figure 10:
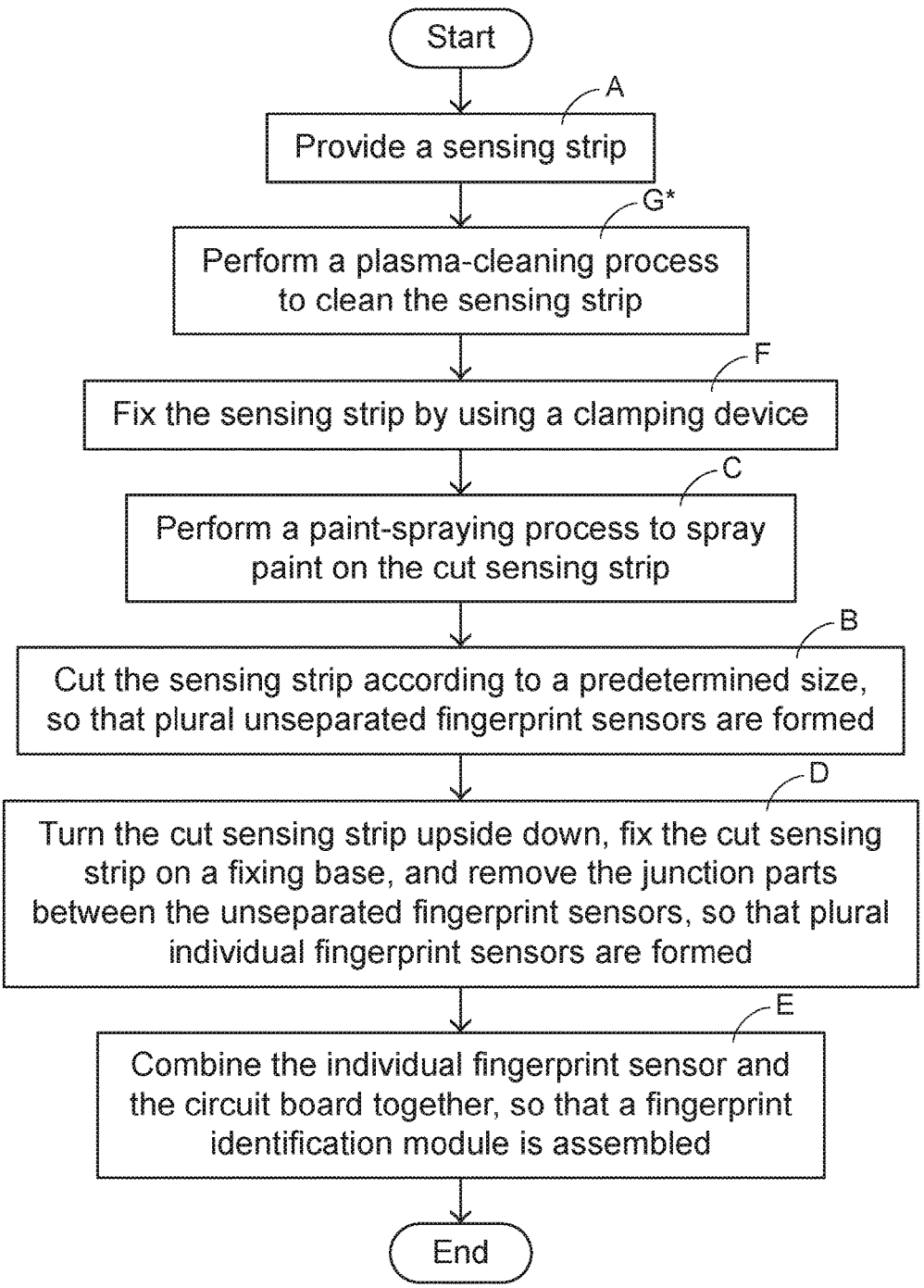
FIG. 10 schematically illustrates a flowchart of a method for assembling a fingerprint identification module according to a third embodiment of the present invention.

The present invention further provides a third embodiment, which is slightly distinguished from the above embodiments. FIG. 10 schematically illustrates a flowchart of a method for assembling a fingerprint identification module according to a third embodiment of the present invention. The method comprises the following steps.

In a step A, a sensing strip is provided.

In a step G*, a plasma-cleaning process is performed to clean the sensing strip.

In a step F, the sensing strip is fixed by a clamping device.

In a step C, a paint-spraying process is performed to spray paint on the cut sensing strip.

In a step B, the sensing strip is cut according to a predetermined size, and thus plural unseparated fingerprint sensors are formed.

In a step D, the cut sensing strip is turned upside down and fixed on a fixing base, and the junction parts between the unseparated fingerprint sensors are removed, so that plural individual fingerprint sensors are formed.

In a step E, the individual fingerprint sensor and the circuit board are combined together, so that a fingerprint identification module is assembled.

The steps of the assembling method of this embodiment are substantially identical to the assembling method of the above embodiments except for the sequence of the steps. Firstly, the step G* of this embodiment is performed before the first cutting operation of the step B. Secondly, the paint-spraying process of the step C is also performed before the first cutting operation of the step B.

In this embodiment, the paint-spraying process is firstly performed, and then the cutting operation is done. Consequently, portions of the lateral surfaces of the individual fingerprint sensor are not coated with the paint. The individual fingerprint sensor obtained by this method is suitably used in some kinds of electronic device. For example, the individual fingerprint sensor is suitably used in the electronic device where the lateral surfaces of the individual fingerprint sensor are not exposed. Alternatively, the individual fingerprint sensor is suitably used in the electronic device where the lateral surfaces of the individual fingerprint sensor are sheltered by other components.

From the above descriptions, the present invention provides a method for assembling a fingerprint identification module. During the process of cutting the sensing strip, the junction parts between the unseparated fingerprint sensors are retained. Consequently, the cut sensing strip is still a one-piece structure. Under this circumstance, it is easy to perform a paint-spraying operation on the large area of the one-piece structure of the sensing strip for a single time. Since the assembling time is reduced, the production efficiency is enhanced. Moreover, since it is not necessary to use the adhesive and the procedure of removing the residual fragments of the adhesive is omitted, the production efficiency is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A method for assembling a fingerprint identification module, the method comprising steps of:
    (A) providing a sensing strip, wherein the sensing strip comprises plural unseparated fingerprint sensors, and the plural unseparated fingerprint sensors are connected with each other through junction parts, wherein the junction part has a first thickness;
    (B) cutting a top surface of the sensing strip according to a predetermined size, so that plural unseparated fingerprint sensors are defined and the junction part has a second thickness, wherein the second thickness is smaller than the first thickness;
    (C) performing a paint-spraying process to spray paint on the cut sensing strip;
    (D) turning the cut sensing strip upside down and fixing the cut sensing strip on a fixing base, and removing the junction parts, so that plural individual fingerprint sensors are produced, wherein the fixing base comprises a plurality of recesses respectively corresponding to the unseparated fingerprint sensors, and one of the recesses has a portion having a width less than a width of one of the unseparated fingerprint sensors, and a top surface of the one of the unseparated fingerprint sensors is in contact with the portion; and
    (E) combining one of the plural individual fingerprint sensor and a circuit board together, so that the fingerprint identification module is assembled.

2. The method according to claim 1, wherein before the step (B), the method further comprises a step (F) of using a clamping device to fix the sensing strip.

3. The method according to claim 1, wherein in the step (B), a first length of the top surface of the unseparated fingerprint sensor is close to a first predetermined length of the predetermined size, and a first width of the top surface of the unseparated fingerprint sensor is close to a first predetermined width of the predetermined size.

4. The method according to claim 1, wherein before the step (C), the method further comprises a step (G) of performing a plasma-cleaning process to clean the cut sensing strip.

5. The method according to claim 1, wherein the step (D) comprises steps of:
    (D2) activating a vacuum pump of the fixing base to generate a suction force; and
    (D3) removing the junction parts from a bottom surface of the cut sensing strip, so that the plural individual fingerprint sensors are produced.

6. The method according to claim 5, wherein while the junction parts are removed in the step (D3), a concave structure is formed in the bottom surface of the individual fingerprint sensor, so that a size of the bottom surface of the individual fingerprint sensor is smaller than a size of a top surface of the individual fingerprint sensor.

7. A method for assembling a fingerprint identification module, the method comprising steps of:
    (A) providing a sensing strip, wherein the sensing strip comprises plural unseparated fingerprint sensors, and the plural unseparated fingerprint sensors are connected with each other through junction parts, wherein the junction part has a first thickness;
    (B) performing a paint-spraying process to spray paint on the sensing strip;

(C) cutting a top surface of the sensing strip according to a predetermined size, so that plural unseparated fingerprint sensors are defined and the junction part has a second thickness, wherein the second thickness is smaller than the first thickness;

(D) turning the cut sensing strip upside down and fixing the cut sensing strip on a fixing base, and removing the junction parts, so that plural individual fingerprint sensors are produced, wherein the fixing base comprises a plurality of recesses respectively corresponding to the unseparated fingerprint sensors, and one of the recesses has a portion having a width less than a width of one of the unseparated fingerprint sensors, and a top surface of the one of the unseparated fingerprint sensors is in contact with the portion; and (E) combining one of the plural individual fingerprint sensor and a circuit board together, so that the fingerprint identification module is assembled.

8. The method according to claim 7, wherein before the step (B), the method further comprises a step (F) of using a clamping device to fix the sensing strip.

9. The method according to claim 7, wherein before the step (B), the method further comprises a step (G) of performing a plasma-cleaning process to clean the cut sensing strip.

10. The method according to claim 7, wherein the step (D) comprises steps of:

(D2) activating a vacuum pump of the fixing base to generate a suction force; and (D3) removing the junction parts from a bottom surface of the cut sensing strip, so that the plural individual fingerprint sensors are produced.

11. The method according to claim 10, wherein while the junction parts are removed in the step (D3), a concave structure is formed in the bottom surface of the individual fingerprint sensor, so that a size of the bottom surface of the individual fingerprint sensor is smaller than a size of a top surface of the individual fingerprint sensor.

* * * * *